(12) United States Patent     (10) Patent No.: US 8,989,782 B2
Kaul et al.     (45) Date of Patent: Mar. 24, 2015

(54) SYSTEM AND METHOD TO AUTOMATICALLY TRIANGULATE LOCATION BASED ON POPULARITY AND DENSITY RANKING OF VENUES OVER DISTANCE

(71) Applicant: Sprylogics International Corp., Concord (CA)

(72) Inventors: Bhavuk Kaul, San Francisco, CA (US); Aleksandar Zivkovic, North York (CA); Bradley Michael Marks, Toronto (CA); Marvin Igelman, Thornhill (CA)

(73) Assignee: Sprylogics International Corp., Concord, Ontario (CA)

( * ) Notice: Subject to any disclaimer, the term of this patent is extended or adjusted under 35 U.S.C. 154(b) by 29 days.

(21) Appl. No.: 13/861,100

(22) Filed: Apr. 11, 2013

(65) Prior Publication Data

US 2013/0273942 A1     Oct. 17, 2013

Related U.S. Application Data

(60) Provisional application No. 61/622,784, filed on Apr. 11, 2012.

(51) Int. Cl.
    *H04W 4/02*     (2009.01)

(52) U.S. Cl.
    CPC .................................... *H04W 4/021* (2013.01)
    USPC .................................... 455/456.3; 455/456.1

(58) Field of Classification Search
    USPC ................................ 455/412.1, 456.1, 456.3
    See application file for complete search history.

(56) References Cited

U.S. PATENT DOCUMENTS

2012/0254186 A1\* 10/2012 Winner et al. ................ 707/740

\* cited by examiner

*Primary Examiner* — Sam Bhattacharya
(74) *Attorney, Agent, or Firm* — Sunstein Kann Murphy & Timbers LLP (57) ABSTRACT

Methods, systems, and computer program products determine, for a number of individuals having a common interest, locations relevant to that common interest. Each individual possesses a user terminal that has a location and executes a messaging application. During the course of a messaging conversation, the application transmits search parameters to a central server. The search parameters may be entered manually or determined automatically by analyzing the conversation. The server identifies clusters of locations that satisfy the search parameters in addition to satisfying geographic proximity to the participants in the conversation. The server scores the clusters, and transmits to the user terminal data relating thereto, for integrated display in the messaging application. Relevant advertising may be identified and transmitted for contemporaneous display.

20 Claims, 7 Drawing Sheets

SYSTEM AND METHOD TO AUTOMATICALLY TRIANGULATE LOCATION BASED ON POPULARITY AND DENSITY RANKING OF VENUES OVER DISTANCE

CROSS-REFERENCE TO RELATED APPLICATION

This application claims the benefit of U.S. Provisional Application 61/622,784, filed Apr. 11, 2012, the contents of which are incorporated herein by reference in their entirety.

FIELD OF THE INVENTION

The present invention relates to providing a user terminal with a list of objects or list of objects on a map based on density and popularity ranking of the places.

BACKGROUND OF THE INVENTION

"Location-based services" is a general term used in the computer/networking field to indicate services that take a user's location into account. This can be done, for example, to provide directions (navigation) to the user, providing advertisements or other offers to the user (e.g., coupons, discount offers, etc.), or locating venues for the user (e.g., restaurants, shops, etc.).

One class of location-based services relates to collaborative decision support for multiple users, such as, for example, selecting a restaurant that is convenient for a number of users. Some examples of such location-based services can be found in Espeter, Martin et al, "Location-Based Decision Support for User Groups", Journal of Location Based Services, Vol. 3, Issue 3, 2009, pp. 165-187.

SUMMARY OF THE INVENTION

Various method, system, and computer program product embodiments determine, for a number of individuals having a common interest, locations relevant to that common interest. Each individual possesses a user terminal that has a location and executes a messaging application. During the course of a messaging conversation, the application transmits search parameters to a central server. The search parameters may be entered manually or determined automatically by analyzing the conversation. The server identifies clusters of locations that satisfy the search parameters in addition to satisfying geographic proximity to the participants in the conversation. The server scores the clusters, and transmits to the user terminal data relating thereto, for integrated display in the messaging application. Relevant advertising may be identified and transmitted for contemporaneous display.

Illustrative methods of the present invention are directed to determining, for a set of one or more individuals having a common interest, clusters of locations that are relevant to that common interest. Each individual has a user terminal having a location. The method includes five computer processes. The first process requires receiving search parameters pertaining to the common interest via a data communication network from a given user terminal possessed by an individual in the plurality. The second computer process requires determining a collection of locations that provide goods or services satisfying the search parameters as a function of the locations of the user terminals possessed by the one or more individuals in the set. The third computer process requires identifying clusters of locations in the collection of locations. The fourth computer process requires providing a cluster score to each cluster. The fifth computer process requires transmitting, toward the given user terminal via the data communication network, data indicating the clusters according to their relative cluster scores.

Various modifications on the basic method are contemplated. The common interest may be automatically determined by a messaging application executing on the given user terminal. Determining the collection of locations may include determining a geographic center of the locations of the user terminals. In this case, determining the collection of locations may further include searching within a circle centered at the determined geographic center that contains the locations of the user terminals possessed by each individual in the plurality. Identifying clusters of locations may include applying a flood fill algorithm to the collection of locations. Each cluster score for a cluster may be a function of one or more of a satisfaction rating of a location in the cluster, the number of locations in the cluster, an average distance from the cluster to the individuals in the plurality, a crime rate of a geographic area of the cluster, a trendiness of a geographic area of the cluster, and accessibility of a geographic area of the cluster. The search parameters may be determined automatically by analyzing a messaging conversation provided by a messaging application executing in the given user terminal. At least one of determining, identifying, or providing may take into account a preference of at least one individual in the plurality.

The method may be augmented by displaying text or images representing the clusters on the given user terminal. Clusters having a plurality of locations may be represented by shaded areas on a map. The shaded area for each cluster may be colored as a function of the cluster score of the cluster. Alternately or in addition, the method may include transmitting advertisement data, relating to a good or service provided by a location in the collection of locations, toward the given user terminal for display thereon.

There are also contemplated a system and a computer program product for implementing the above-identified method and its variations.

BRIEF DESCRIPTION OF THE DRAWINGS

The foregoing and advantages of the invention will be appreciated more fully from the following further description thereof with reference to the accompanying drawings wherein.

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

Various method, system, and computer program product embodiments determine, for a number of individuals having a common interest, locations relevant to that common interest. Each individual possesses a user terminal that has a location and executes a messaging application. During the course of a messaging conversation, the application transmits search parameters to a central server. The search parameters may be entered manually or determined automatically by analyzing the conversation. The server identifies clusters of locations that satisfy the search parameters in addition to satisfying geographic proximity to the participants in the conversation. The server scores the clusters, and transmits to the user terminal data relating thereto, for integrated display in the messaging application. Relevant advertising may be identified and transmitted for contemporaneous display.

Figure 1:
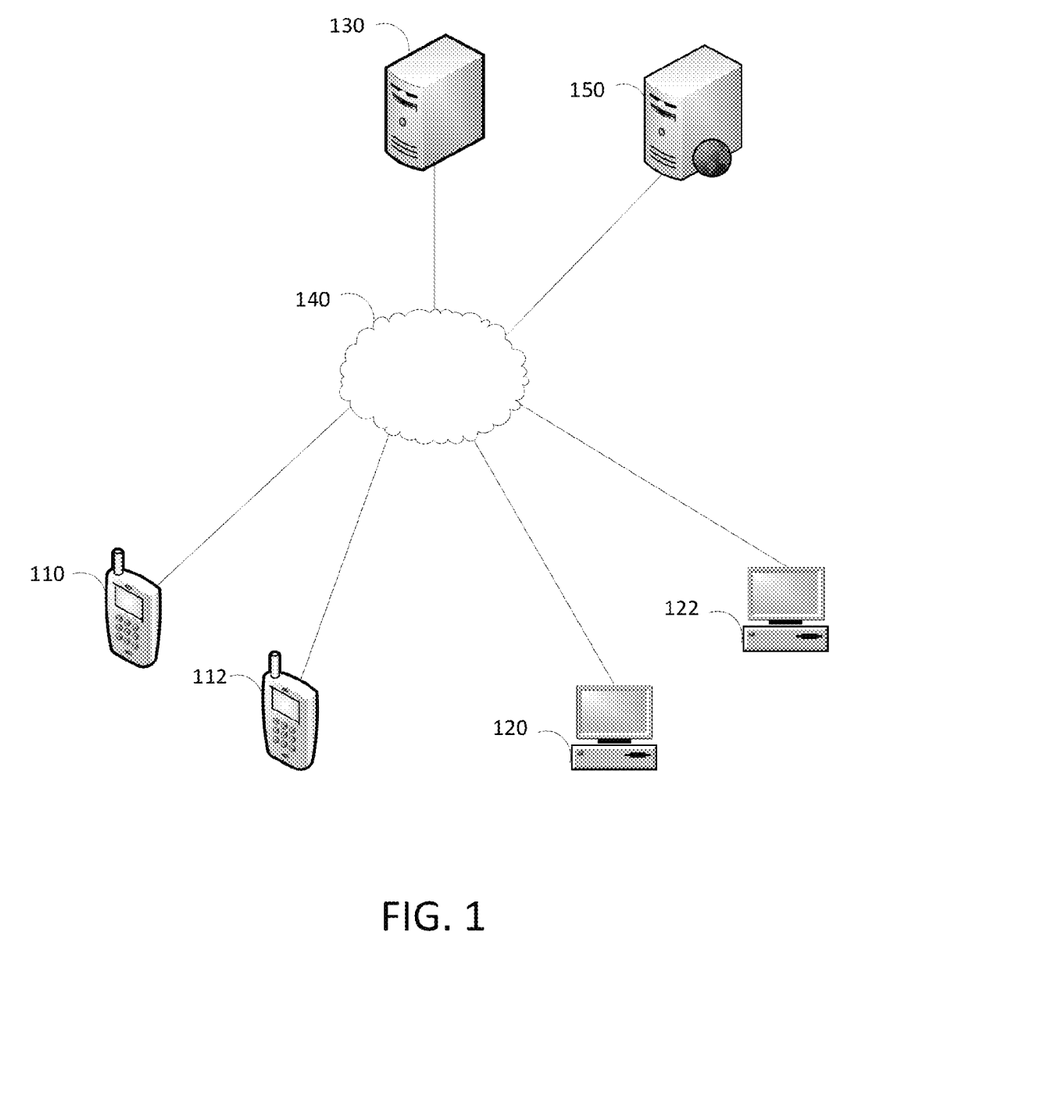
FIG. 1 is a schematic diagram of a triangulation system, in accordance with an exemplary embodiment.

FIG. 1 is a schematic diagram of a system in accordance with an exemplary embodiment of the invention. In this example, a number of user terminals (e.g., mobile terminals 110, 112 and/or fixed terminals 120, 122) are in communication with a server 130 over a data communication system 140. A "user terminal" or "terminal" is an electronic device that is configured to execute a messaging application. A user terminal may be, for example, a cell phone, a smart phone, a personal digital assistant, a tablet computer, a laptop computer, or a desktop computer. The server 130 may be one or more computing devices, implemented using hardware known in the art, for providing search queries and returning results; the depiction of one server in FIG. 1 should not be viewed as limiting. The data communication system 140 may include various networks such as wireless networks, wired networks, cellular telephone networks, satellite networks, the Internet, or a combination of these.

Each terminal 110-122 executes a messaging application. A "messaging application" is a computer program or collection of programs that is able to transmit, by and between a plurality of individuals, textual messages that are meaningful to the individuals. Messaging applications include, without limitation: chat rooms, bulletin board applications, email applications, instant messaging applications, short messaging service ("SMS") or texting applications, and voice and video communications for which automatic transcription (speech-to-text) is provided. Each user terminal 110-122 may download the messaging application from the server 130, or obtain it in other ways (e.g., through an "app store" or from a CD-ROM). The messaging application allows the user terminals 110-122 to communicate with one another with and the server 130. The server 130 may or may not be involved with the inter-user messaging.

The user terminals 110-122 generate search queries during the course of their operation. These queries may be generated in response to a user filling out a search form provided by the messaging application, or the messaging application may generate the queries without directed user input. Search queries generated by the messaging application of a user terminal 110-122 are transmitted to and processed by the server 130. During the course of the processing, described in more detail below, the server 130 may send a search query to an online search engine 150 for auxiliary processing. The server 130 processes the search results and returns to the relevant user terminals triangulated search results, which may be in the form of a list, a map (e.g., as shown in FIG. 12), or otherwise.

Figure 2:
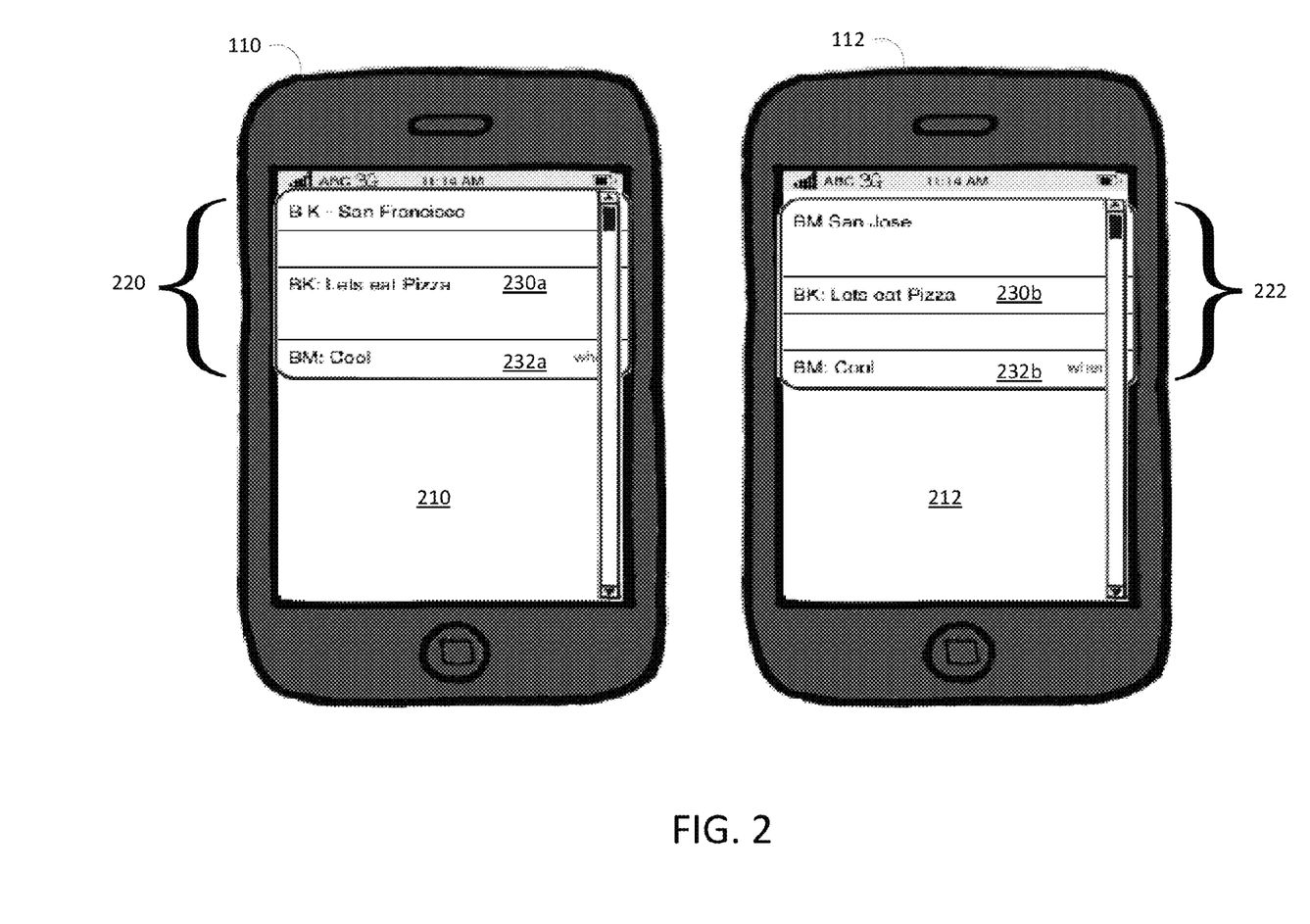
FIG. 2 shows user terminal applications in accordance with one embodiment of the invention.

FIG. 2 shows a user terminal application in accordance with one embodiment of the present invention where two users are exchanging messages. A user identified by their initials "BK" has a first mobile user terminal 110, and a user "BM" has a second mobile user terminal 112. Although the figure shows these user terminals 110, 112 next to each other for convenience, in a typical embodiment these user terminals would be separate by a distance. For example, the user "BK" may be in San Francisco, Calif., while the user "BM" is in San Jose, a driving distance of about 48 miles. Each user terminal 110, 112 includes a respective messaging application 210, 212. The messaging applications 210, 212 are displaying messaging conversations 220, 222. A "messaging conversation", "conversation", or "messaging experience" is a series of one or more topical messages transmitted between individuals using a messaging application. For example, in this figure two messages are shown. The first message, from user "BK", is "Lets eat Pizza", and appears on the screens of both user terminals 110, 112 as message 230a, 230b respectively. The second message, from user "BM" responding to this request, is "Cool", and appears on the screens of both user terminals 110, 112 as message 232a, 232b respectively. In this way, the two users may carry on a topical conversation.

It should be appreciated that the messaging applications 210, 212 are able to identify the locations of their respective user terminals 110, 112. Identification of the locations may be made in any number of ways known in the art. For example, the messaging application may access a GPS unit or a cellular telephone communication unit in a mobile user terminal to determine an approximate location. Stationary user terminals such as desktop computers may have their locations manually entered by users, for example by ZIP code or street address, or they may be determined automatically by the messaging application, for example, by consulting a geolocation service based on an Internet Protocol (IP) address of the user terminal. Location information also may be stored in a user profile. Typically, location information is converted into longitude and latitude values to facilitate location-based searching.

Figure 3A:
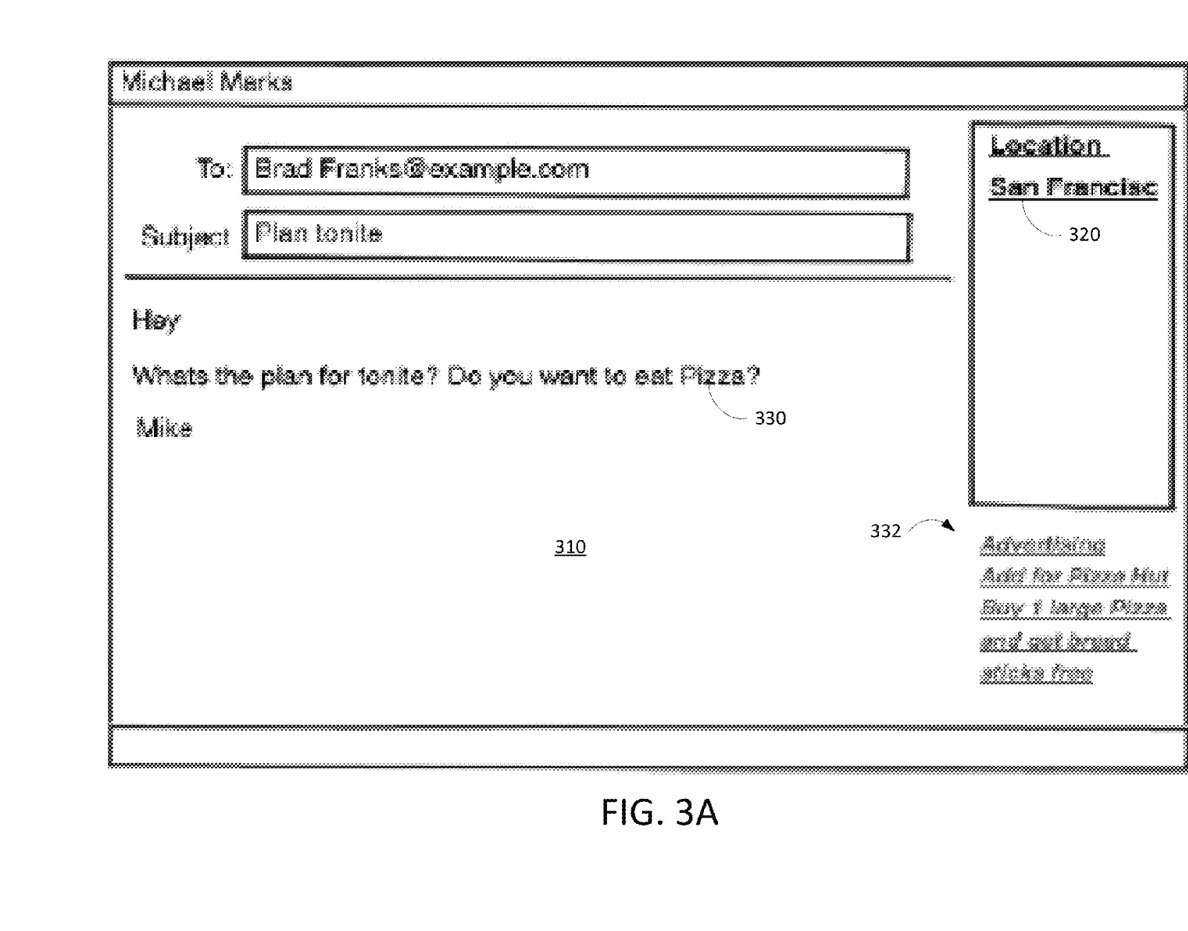
FIGS. 3A and 3B show user terminal applications in accordance with another embodiment of the invention.
Figure 3B:
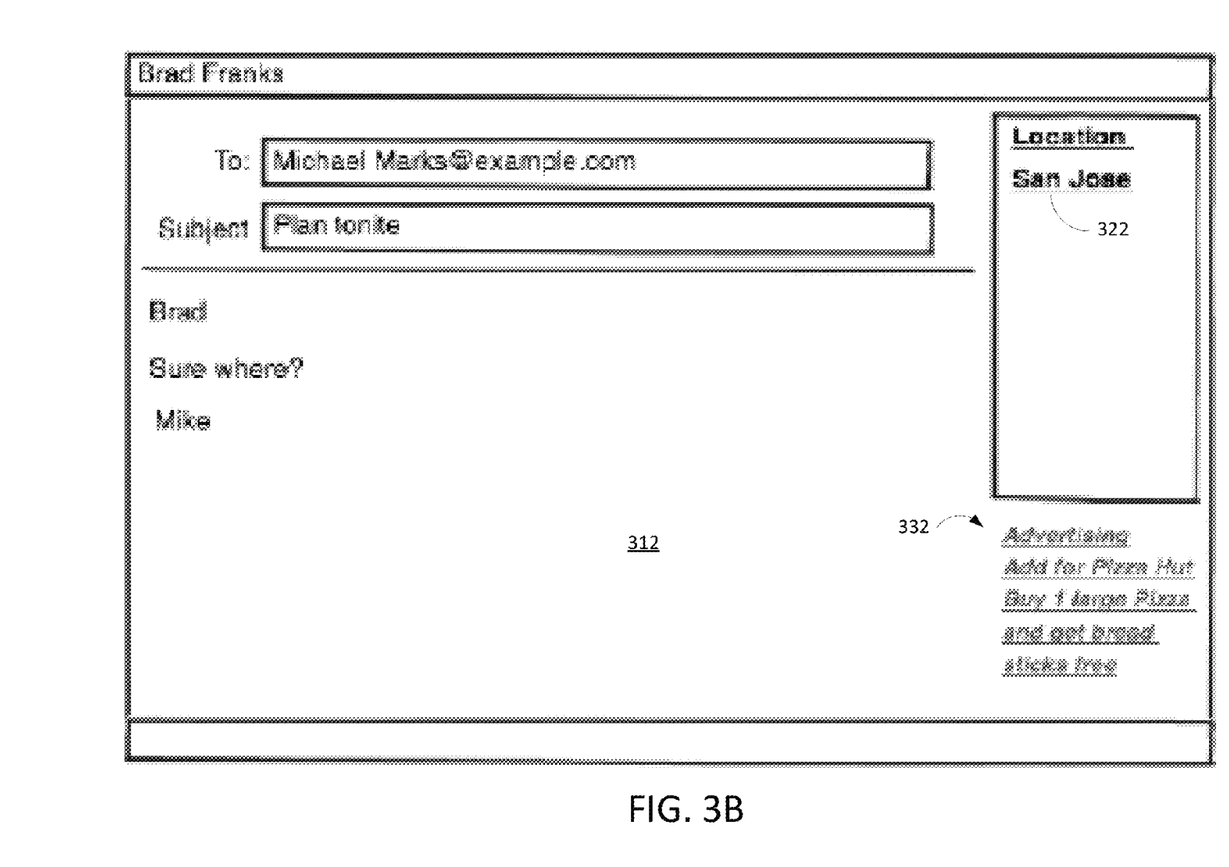

FIGS. 3A and 3B show user terminal applications in accordance with another embodiment of the present invention. FIG. 3A shows a first email sent by "Michael Marks" to "Brad Franks", and FIG. 3B shows the reply email. In this embodiment, the messaging applications 310, 312 are email clients running on either mobile devices or fixed user terminals. As with the instant messaging application of FIG. 2, the email client applications of FIGS. 3A and 3B identify the locations 320, 322 of the respective user terminals which are used to provide location-based services as discussed more fully herein. It should be noted that, in accordance with known messaging techniques, different users may be using different types of user terminals. For example, one user may be using a mobile device, while another user may be using a fixed terminal.

In order to provide a richer messaging experience, system embodiments and method embodiments in accordance with the invention may identify one or more entities in a messaging conversation. For example, the email of FIG. 3A relates to the entity 'pizza', identified by the keyword "Pizza" 330. More generally, an "entity" is a concept of potential interest to an individual, that is meaningful within the context of a topic of a messaging conversation. An entity may be one or more recognized words associated with an ontology, for example (and not by way of limitation): a person, people, place, event, product, domain url, e-mail, phone, address location, company, date, time, money, percentage, airline name, airline flight number, holiday greeting, movie, sporting event, relations and other categories that are relevant to the subject matter and topical area or areas of a messaging conversation In accordance with some embodiments of the invention, the messaging application automatically identifies entities and transmits them to a server (e.g., server 130) for further processing, as described below in more detail. Such identification can be accomplished without user input for that purpose. As a result of the server processing, the server may identify related content, and return to the user terminal pertinent data, such as advertising data. Thus, an advertisement 332 is shown in FIGS. 3A and 3B. Because both Michael Marks and Brad Franks are part of the same messaging conversation, both are shown the same advertisement. For an example of how such automatic identification may be accomplished, see U.S. patent application Ser. No. 13/734,051 filed Jan. 4, 2013 and entitled "System and Method to Automatically Aggregate and Extract Key Concepts Within a Conversation by Semantically Identifying Key Topics".

Figure 4A:
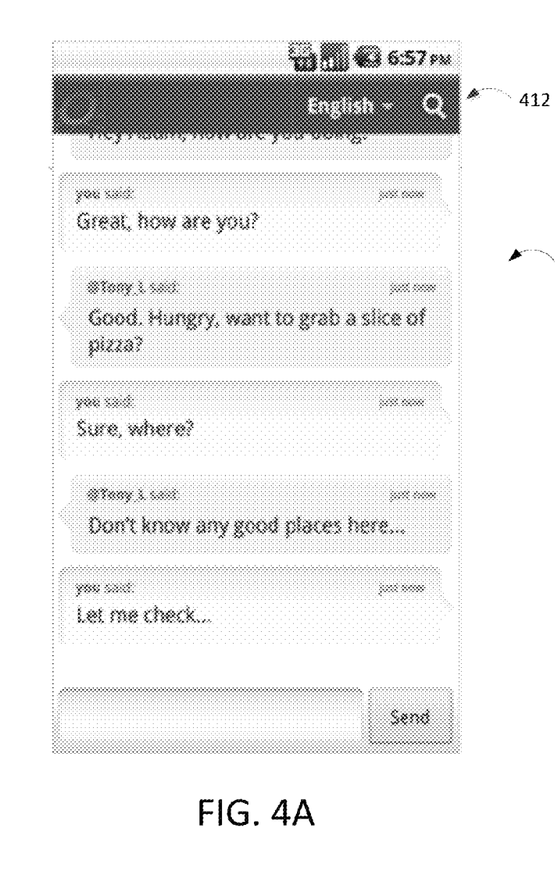
FIGS. 4A and 4B show a user terminal application in accordance with yet another embodiment of the invention.

In accordance with other embodiments of the invention, the messaging application does not automatically identify entities; instead, one of the conversation participants expressly identifies them in a search query. For example, consider the embodiment of the invention shown in FIGS. 4A and 4B. In this embodiment, an unnamed user is sending messages to "Tony_L" using a mobile user terminal. The conversation 410 in FIG. 4A has progressed to the point where the participants have agreed to eat pizza, so the user wishes to locate a nearby pizza restaurant. Thus, the user activates a search function 412, which presents the search box 420 and keyboard image 430 shown in FIG. 4B. Subsequently, the user has entered "Best pizza nearby" into the search box 420, permitting the search terms to be sent to the server (e.g., server 130) when the user activates the search button 440.

It should be appreciated that messaging conversations may occur between more than two individuals possessing user terminals. An email chain, or a group instant messaging conversation, or other group conversation may have any number of participants. In such cases, any or all of the individuals participating in the conversation may receive the same advertisement, or different advertisements based on the respective locations of the individuals.

Figure 4B:
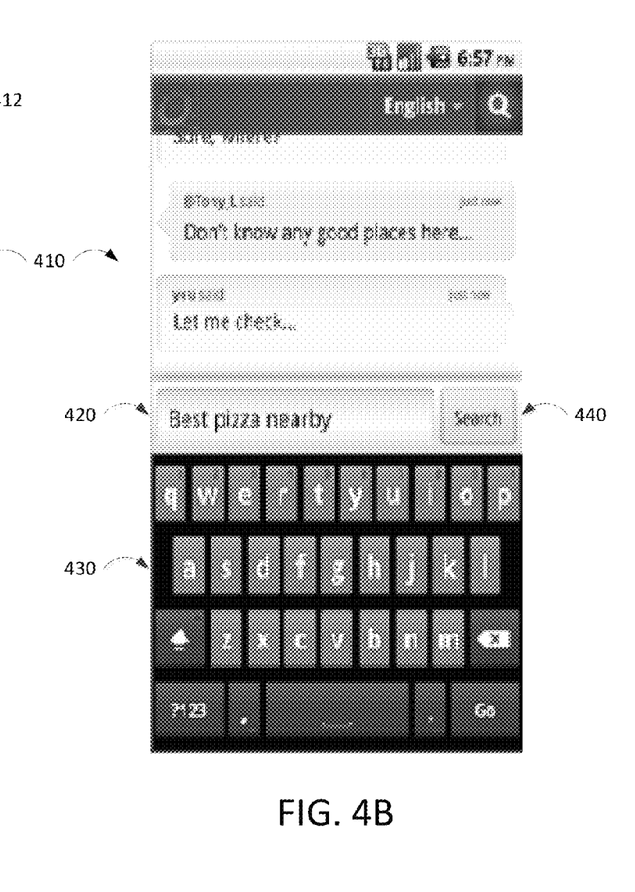
Figure 5:
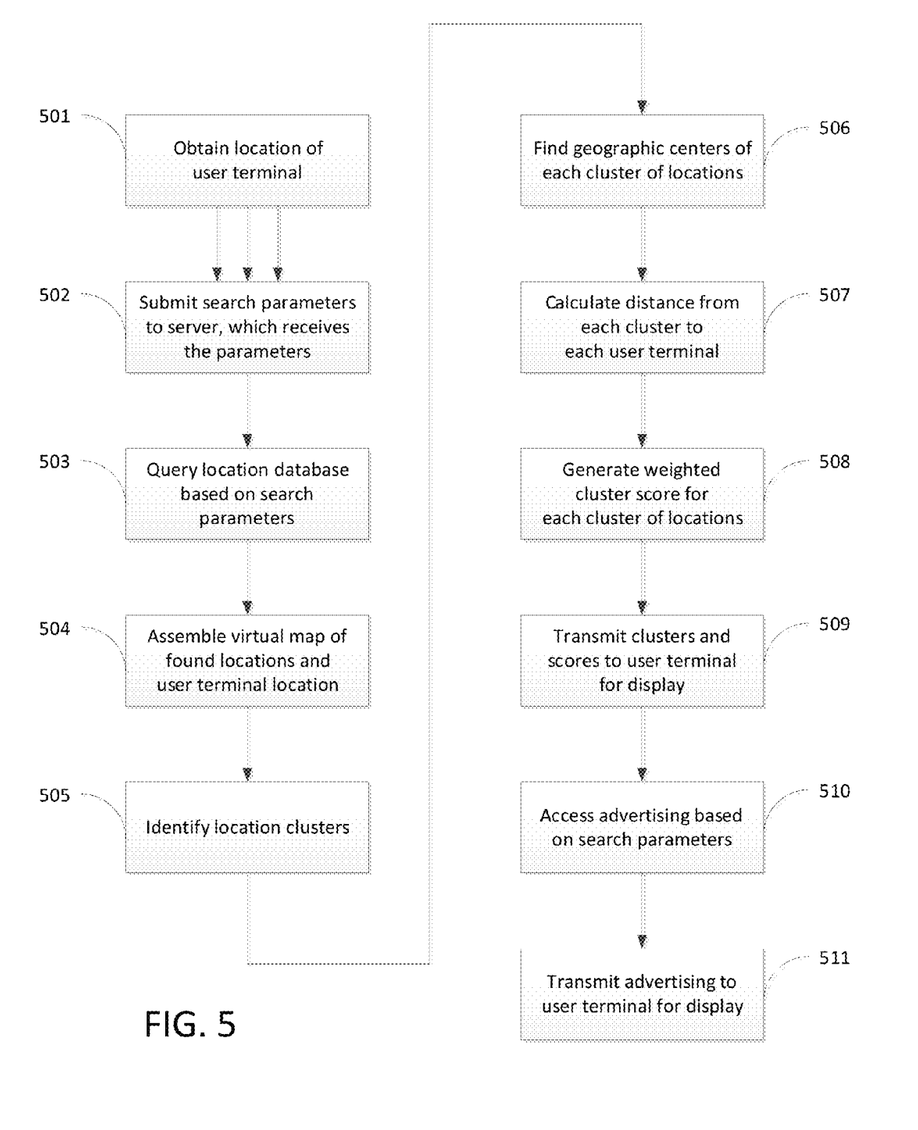
FIG. 5 is a flow chart for triangulation, in accordance with an exemplary embodiment of the present invention.

FIG. 5 is a flow chart for determining locations relevant to a common interest shared by a number of individuals, in accordance with an exemplary embodiment of the present invention. In process 501, the location is obtained from users. The location can be obtained from mobile devices or from desktops, through the user of location APIs or through user input, as described above. In process 502, a messaging application executing on a user terminal submits search parameters pertaining to a common interest to a server via a data communication network. The parameters could be automatically determined by the messaging application from the conversation through the interpretation of the context of the conversation, as shown in FIGS. 3A and 3B. For example, if users are discussing tuna rolls, the parameters may include sushi restaurants specifically or Japanese restaurants generally. Alternately, the parameters could come from an explicit query, such as a user entering a search term into a search box as shown in FIG. 4B.

In process 503, given the query and one or more geographic locations, the server queries a location database to find locations that fit the requested criteria. This may be facilitated, for example, by determining a geographic center of the locations of all of the user terminals, and searching in a nearby area for relevant locations. The nearby area may be, for example, a circle that contains at least the locations of the user terminals possessed by the individuals in the conversation. Searching may involve transmitting a search query to an external search engine (e.g., search engine 150). When a location is identified, for example a sushi restaurant, the search results may refer to related information, such as a customer review or a customer rating. The end result of process 503 is a plurality of locations which have geographic information as well as, in some cases, average user rating or some other indication of the user feedback as to the quality of the establishment.

In process 504, the server assembles the locations of the users and the locations of the resulting search onto a virtual map. The map is not used for display purposes—instead, it signifies the search space with associated geographic locations and associated ratings as well as users locations. The map consists of users' locations, the determined geographic center of users' locations, and all of the locations that satisfy the search criteria. The data are organized in such a fashion that geographic queries can be performed against it using widely known geographic distance calculations.

In process 505, location clusters are identified. A "cluster" is a collection of adjacent locations, where adjacency is determined as a function of a spatial resolution. For example, if the search area is limited to a crowded downtown area, then the spatial resolution could be a city block; that is, search result locations on adjacent city blocks are considered part of the same cluster of results. For areas over which a larger search is performed, for example as between two or more user terminals in neighboring cities, adjacency may be determined by distances of a mile away or more. Generally speaking, the spatial resolution will be a function of the locations of the individuals participating in the messaging conversation—if these individuals are close to one another, then the resolution will be small, while if they are far apart, the resolution will be larger.

There are various algorithms that can be used to perform the clustering, but a well-known algorithm such as flood fill can be used in this process with satisfactory results. One implementation of process 505 is as follows. The data from process 504 are divided into quadrants. The locations matching the search are mapped onto the quadrants. The quadrants that contain result locations are then recursively checked to see if adjacent quadrants also contain a result location. If so, the adjacent quadrants are aggregated into a single cluster. The process is repeated until all locations are visited by the algorithm. In this way clusters represent areas that contain locations that are isolated from other locations.

Figure 6:
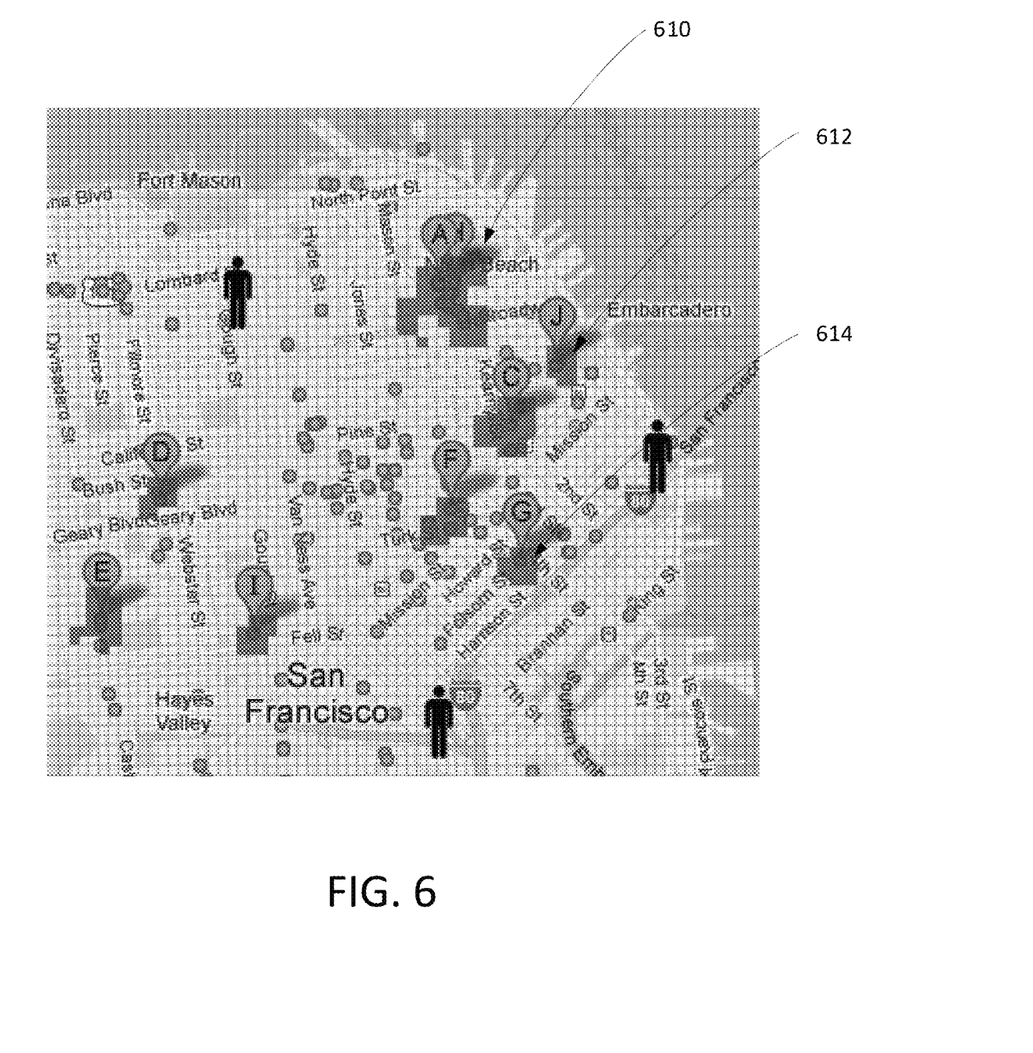
FIG. 6 illustrates a map which identifies clusters of locations, in accordance with an exemplary embodiment.

FIG. 6 illustrates a map which identifies clusters of locations, in accordance with an exemplary embodiment. The map 600 shows a large number of search results, identified by the red circles. The map 600 also shows eight shaded clusters of locations, of which three clusters 610, 612, 614 are identified. In accordance with some embodiments of the invention, the clusters may be colored according to a cluster score that is described below in connection with process 508.

The quadrants that are shaded contain search results that are neighboring each other, which creates a cluster. The locations of the user terminals are indicated in the map by person icons. The search radius is established as the radius that incorporates all of the users from their center. It should be noted that the letters used to identify clusters in may be an indicator of the rank/score of the clusters, e.g., "A" may indicated the highest ranking, "B" may indicate the second highest ranking, etc. Other indicators may be used to indicate the ranking/scoring of the clusters, e.g., using color coding of the clusters (e.g., red=highest rank, yellow=second highest rank, green=third highest rank, etc.). Other color schemes or indicators may be used while remaining within the scope of the invention.

Returning to FIG. 5, in process 506, geographic centers of the locations are found by performing geographic calculations known in the art, such as a center of gravity calculation, a center of minimum distance calculation, or an average latitude and longitude calculation. In process 507, for each cluster, the average distance from each cluster to each of the user terminal locations is calculated using the general geo-distance calculations. Note that this process could include the calculations that take into account travel time, as well as other factors such as availability of public transport or crime rate.

In process 508, a weighted cluster score is generated based on the distance from the users, the average of the ratings for the establishments per cluster, as well as other factors such as crime rate, area trendiness and others. The clusters are then sorted by weighted cluster score and by individual locations scores within the cluster. The weighted cluster score can be calculated based on following formula:

$$\text{Score(cluster)} = (\text{Sum(location ratings)}/\text{number of locations})/(\text{average user distance})*(\text{transit index})*(\text{area trendiness})*(\text{crime rate}).$$

In this formula, location ratings are average ratings provided by users for location, which typically are real numbers with of 0-5 in terms of value (5 being the best). Average user distance is the average distance from the cluster center to all the users locations; lower numbers are better. The transit index is a real number value between 0 and 1 that indicates accessibility using a transport mechanism of choice, for example public transport or a car, with 1 being the value given to most easily accessible. Note that the transit index depends on each user's transportation means, which may be configured by the user in a user profile. Area trendiness is a real number between 0 and 1 which indicates a general desire of people to congregate in the cluster, with 1 being most desirable or trendiest. Crime rate is a real number between 0 and 1 with 1 indicating the area with the least crime.

In process 509, data indicating the resulting clusters and associated locations are transmitted to the requesting user terminal so that users can receive their results on the mobile device or desktop within their application. Separately, the user terminal may display text or images representing the clusters. For example, the data may be displayed as a list or clusters, or it may be displayed as a map similar to FIG. 6.

In process 510 (which could be performed in parallel with process 508), an advertising system is accessed to receive relevant advertising. The advertising system may be implemented as part of the server, or it may be a separate computer system or systems. The advertising system includes a database of advertisements that should be displayed when certain criteria are met. The advertisements may be textual, graphical, or audiovisual, for example. Advertisements may be retrieved based on criteria that are dependent on the factors identified above in connection with the weighted cluster score, or on other factors pertaining to user preferences or other business rules. In process 511, the advertisement (or information indicating who to obtain it) is transmitted to the user terminal for display by the messaging application in association with the search results. This process could be performed in parallel with process 509.

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either party), although in some situations, activity may not necessarily occur in both directions. Single-ended arrows generally indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

It should be noted that terms such as "client," "server," and "terminal" may be used herein to describe devices that may be used in certain embodiments of the present invention and should not be construed to limit the present invention to any particular device type unless the context otherwise requires. Such devices typically include one or more network interfaces for communicating over a communication network and a processor (e.g., a microprocessor with memory and other peripherals and/or application-specific hardware) configured accordingly to perform device functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message. Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

The present invention may be embodied in other specific forms without departing from the true scope of the invention, and numerous variations and modifications will be apparent to those skilled in the art based on the teachings herein. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A computerized method for determining, for a plurality of individuals having a common interest, locations relevant to that common interest, each individual in the plurality possessing a user terminal that has a location, the method comprising:
    in a first computer process, receiving search parameters pertaining to the common interest via a data communication network from a given user terminal possessed by an individual in the plurality;
    in a second computer process, determining a collection of locations that provide goods or services satisfying the search parameters as a function of the locations of the user terminals possessed by the plurality of individuals;
    in a third computer process, identifying clusters of locations in the collection of locations;
    in a fourth computer process, providing a cluster score to each cluster based at least on the proximity from the cluster to the locations of the user terminals; and
    in a fifth computer process, transmitting, toward the given user terminal via the data communication network, data indicating the clusters according to their relative cluster scores.

2. The method of claim 1, wherein the common interest is automatically determined by a messaging application executing on the given user terminal.

3. The method of claim 1, wherein determining the collection of locations includes determining a geographic center of the locations of the user terminals.

4. The method of claim 3, wherein determining the collection of locations further includes searching within a circle centered at the determined geographic center that contains the locations of the user terminals possessed by each individual in the plurality.

5. The method of claim 1, wherein identifying clusters of locations includes applying a flood fill algorithm to the collection of locations.

6. The method of claim 1, wherein each cluster score for a cluster is a function of one or more of: a satisfaction rating of a location in the cluster, the number of locations in the cluster, an average distance from the cluster to the individuals in the plurality, a crime rate of a geographic area of the cluster, a trendiness of a geographic area of the cluster, and accessibility of a geographic area of the cluster.

7. The method of claim 1, further comprising displaying text or images representing the clusters on the given user terminal.

8. The method of claim 7, wherein clusters having a plurality of locations are represented by shaded areas on a map.

9. The method of claim 8, wherein the shaded area for each cluster is colored as a function of the cluster score of the cluster.

10. The method of claim 1, further comprising transmitting advertisement data, relating to a good or service provided by a location in the collection of locations, toward the given user terminal for display thereon.

11. The method of claim 1, wherein the search parameters are determined automatically by analyzing a messaging conversation provided by a messaging application executing in the given user terminal.

12. The method of claim 1, wherein at least one of determining, identifying, or providing takes into account a preference of at least one individual in the plurality.

13. A computer program product for determining, for a set of one or more individuals having a common interest, locations relevant to that common interest, each individual in the plurality possessing a user terminal that has a location, the product comprising a non-transitory medium on which is stored computer-useable program code for:
receiving search parameters pertaining to the common interest from a given user terminal possessed by an individual in the plurality;
determining a collection of locations that provide goods or services that satisfy the search parameters as a function of the locations of the user terminals possessed by the plurality of individuals;
identifying clusters of locations in the collection of locations;
providing a cluster score to each cluster based at least on the proximity from the cluster to the locations of the user terminals; and
transmitting toward the given user terminal data indicating the clusters according to their relative cluster scores.

14. The product of claim 13, wherein the common interest is automatically determined by a messaging application executing on the given user terminal.

15. The product of claim 13, wherein the program code for determining the collection of locations includes program code for determining a geographic center of the locations of the user terminals.

16. The product of claim 15, wherein the program code for determining the collection of locations further includes searching within a circle centered at the determined geographic center that contains the locations of the user terminals possessed by each individual in the plurality.

17. The product of claim 13, wherein the program code for identifying clusters of locations includes program code for applying a flood fill algorithm to the collection of locations.

18. The product of claim 13, wherein each cluster score for a cluster is a function of one or more of: a satisfaction rating of a location in the cluster, the number of locations in the cluster, an average distance from the cluster to the individuals in the plurality, a crime rate of a geographic area of the cluster, a trendiness of a geographic area of the cluster, and accessibility of a geographic area of the cluster.

19. The product of claim 13, further comprising program code for transmitting advertisement data, relating to a good or service provided by a location in the collection of locations, toward the given user terminal for display thereon.

20. The product of claim 13, wherein the program code for at least one of determining, identifying, or providing takes into account a preference of at least one individual in the plurality.

* * * * *